US010212456B2

United States Patent
Guo et al.

(10) Patent No.: US 10,212,456 B2
(45) Date of Patent: Feb. 19, 2019

(54) DEBLOCKING FILTER FOR HIGH DYNAMIC RANGE (HDR) VIDEO

(71) Applicant: Apple Inc., Cupertino, CA (US)

(72) Inventors: Mei Guo, San Jose, CA (US); Feng Yi, San Jose, CA (US); Jun Xin, Sunnyvale, CA (US); Chris Y. Chung, Sunnyvale, CA (US); Yeping Su, Sunnyvale, CA (US); Xiaosong Zhou, Campbell, CA (US); Jun Xu, Sunnyvale, CA (US); Hsi-Jung Wu, San Jose, CA (US); Jingteng Xue, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 15/612,806

(22) Filed: Jun. 2, 2017

(65) Prior Publication Data
US 2018/0352264 A1    Dec. 6, 2018

(51) Int. Cl.
    *H04N 19/86* (2014.01)
    *H04N 19/117* (2014.01)
    *H04N 19/159* (2014.01)

(52) U.S. Cl.
    CPC ........... *H04N 19/86* (2014.11); *H04N 19/117* (2014.11); *H04N 19/159* (2014.11)

(58) Field of Classification Search
    CPC ..... H04N 19/159; H04N 19/117; H04N 19/86
    See application file for complete search history.

(56) References Cited

U.S. PATENT DOCUMENTS

| 2010/0027686 A1* | 2/2010 | Zuo | G06T 9/00 375/240.29 |
| 2015/0341611 A1* | 11/2015 | Oh | H04N 9/8722 386/230 |
| 2017/0244980 A1* | 8/2017 | Monnier | H04N 19/86 |
| 2018/0048845 A1* | 2/2018 | Kozuka | H04N 5/20 |
| 2018/0048892 A1* | 2/2018 | Norkin | H04N 1/60 |

(Continued)

OTHER PUBLICATIONS

T. Borer, A. Cotton and P. Wilson, "Perceptual Uniformity for High Dynamic Range Television Systems," SMPTE 2015 Annual Technical Conference and Exhibition, Loews Hollywood Hotel, Hollywood, CA, 2015, pp. 1-15. (Year: 2015).*

(Continued)

*Primary Examiner* — Jamie J Atala
*Assistant Examiner* — Michael Robert Cammarata
(74) *Attorney, Agent, or Firm* — Baker & Hostetler LLP (57) ABSTRACT

Methods of in-loop deblocking filter for high dynamic range (HDR) video compression are disclosed. HDR processing and standard dynamic range (SDR) processing adopt different electro-optical transfer function (EOTF) to convert digital code words to linear luminance. For compressing HDR video, EOTF is proposed to be involved in the selection of two deblocking parameters, $\beta$ and $t_C$, which control the strength of deblocking filter. In local activity checking for filter decisions, the calculated local signal characteristics and the thresholds are adjusted according to EOTF. After deblocking filter, the clipping range is modified based on EOTF. The chroma deblocking filter is also extended to inter-inter block boundary.

20 Claims, 6 Drawing Sheets

(56) References Cited

U.S. PATENT DOCUMENTS

2018/0160127 A1* 6/2018 Strom ................ G09G 5/02

OTHER PUBLICATIONS

C. Feichtenhofer, H. Fassold and P. Schallauer, "A Perceptual Image Sharpness Metric Based on Local Edge Gradient Analysis," in IEEE Signal Processing Letters, vol. 20, No. 4, pp. 379-382, Apr. 2013. (Year: 2013).*
P. List, A. Joch, J. Lainema, G. Bjontegaard and M. Karczewicz, "Adaptive deblocking filter," in IEEE Transactions on Circuits and Systems for Video Technology, vol. 13, No. 7, pp. 614-619, Jul. 2003. (Year: 2003).*
A. Norkin et al., "HEVC Deblocking Filter," in IEEE Transactions on Circuits and Systems for Video Technology, vol. 22, No. 12, pp. 1746-1754, Dec. 2012. (Year: 2012).*

* cited by examiner

DEBLOCKING FILTER FOR HIGH DYNAMIC RANGE (HDR) VIDEO

BACKGROUND

The present disclosure is directed to video coding and decoding techniques and, in particular, to application of deblocking filters.

A deblocking filter is a video filter applied to decoded compressed video to improve visual quality and prediction performance by smoothing edges that can arise from block-based coding artifacts. Deblocking filtering aims to improve the appearance of decoded pictures by reducing these artifacts.

Deblocking filtering techniques are defined in the ITU H.264 (also known as "AVC") and H.265 ("HEVC") coding protocols. Deblocking filtering can be applied within the motion prediction loop of a video encoder or decoder by applying a deblocking filter to reference frames before the reference frames are stored for later use in predicting other image data to be coded (or decoded) after the reference frames are coded (or decoded). When a video stream is encoded, the filter strength can be selected, or the filter can be switched off entirely. Filter strength is determined by coding parameters (including coding modes, motion vectors, reference frames and coded residue) of adjacent blocks, quantization step size, and the steepness of the luminance gradient between blocks.

A deblocking filter operates at the boundary between blocks of pixel data, such as between motion prediction block boundaries or transform unit block boundaries. For example in H.265, the filter may operate on the edges of each 4×4 or 8×8 block of luma and chroma data of each picture. Only the edges that are either prediction block edges or transform block edges are subject to deblocking. Each small block's edge is assigned a boundary strength based on the coding modes (intra/inter) of the blocks, whether references (in motion prediction and reference frame choice) differ, whether any of the blocks have coded residue, and whether it is a luma or chroma edge. Stronger levels of filtering are assigned by this scheme where there is likely to be more distortion. The filter can modify as many as three samples on either side of a given block edge (in the case where an edge is a luma edge that has "Strong Filtering Mode"). In most cases it can modify one or two samples on either side of the edge (depending on the quantization step size, the tuning of the filter strength by the encoder, the result of an edge detection test, and other factors).

High dynamic range (HDR) digital image data has become common and may differ in various aspects from standard dynamic range (SDR) representations of video data. For example, HDR may allow for representations of a wider dynamic range of luminosity, may be a higher precision representation, and may use different electro-optical transfer function (EOTF). An EOTF defines how to convert digital code words to linear luminance. Compared to SDR processing which uses Gamma EOTF as recommended in ITU-R BT.1886, HDR processing has a greater dynamic range of luminosity to reproduce the real world and adopts a different EOTF, for example, perceptual quantizer (PQ) as recommended in SMPTE ST 2084. With an HDR EOTF, coding distortion and activity measurements are related to the brightness of pixels.

The inventors have determined that presently-available deblocking techniques, such as the deblocking filters of AVC and HEVC, do not provide optimal performance applied to HDR image data. Accordingly, they have identified a need for modified deblocking filter parameter selection to improve the quality of HDR image data recovered by video decoders.

DETAILED DESCRIPTION

Embodiments of the present disclosure provide techniques for modification and application of a deblocking filter as may be employed in video encoding and decoding systems. Techniques described here may be useful, for example, when applied to high dynamic range (HDR) image data. According to these techniques, parameters of a deblocking filter system designed for a reference image data representation, such as standard dynamic range (SDR), may be modified based on differences between a reference and HDR electro-optical transfer functions (EOTFs). For example, a comparison between the EOTFs of HDR and SDR data can be used to determine or adjust SDR deblocking filter parameters such as: $\beta$, $t_C$, a measure of local activity at pixel block boundaries, an activity threshold for controlling a deblocking filter, and a clipping range. In some embodiments, the comparison of EOTFs may be a ratio of EOTFs at an average brightness of the pixels near the block boundary. Additionally, techniques described include filtering of chroma pixel data with a deblocking filter applied at a pixel block boundaries between an inter-predicted block and an inter-predicted block.

Figure 1A:
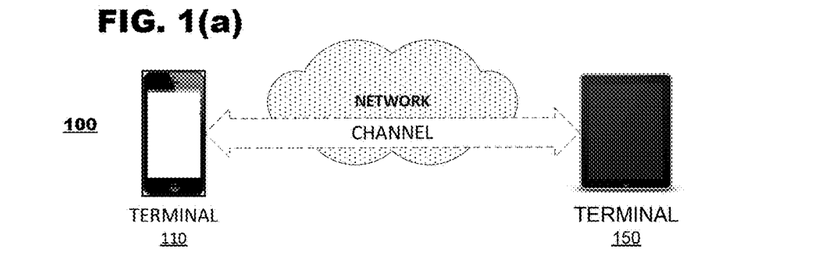
FIG. 1(a) is a simplified block diagram of an example video delivery system.

FIG. 1(a) is a simplified block diagram of a video delivery system 100 according to an embodiment of the present disclosure. The system 100 may include a plurality of terminals 110, 150 interconnected via a network. The terminals 110, 150 may code video data for transmission to their counterparts via the network. Thus, a first terminal 110 may capture video data locally, code the video data, and transmit the coded video data to the counterpart terminal 150 via a channel. The receiving terminal 150 may receive the coded video data, decode it, and render it locally, for example, on a display at the terminal 150. If the terminals are engaged in bidirectional exchange of video data, then the terminal 150 may capture video data locally, code the video data, and transmit the coded video data to the counterpart terminal 110 via another channel. The receiving terminal 110 may receive the coded video data transmitted from terminal 150, decode it, and render it locally, for example, on its own display.

A video coding system 100 may be used in a variety of applications. In a first application, the terminals 110, 150 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 150). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1(*a*), the terminals 110, 150 are illustrated as smart phones and tablet computers, respectively, but the principles of the present disclosure are not so limited. Embodiments of the present disclosure also find application with computers (both desktop and laptop computers), computer servers, media players, dedicated video conferencing equipment, and/or dedicated video encoding equipment. Embodiments may be performed by instructions stored in memory and executed on computer processors, and may also be performed by special-purpose hardware.

The network represents any number of networks that convey coded video data between the terminals 110, 150, including, for example, wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 1B:
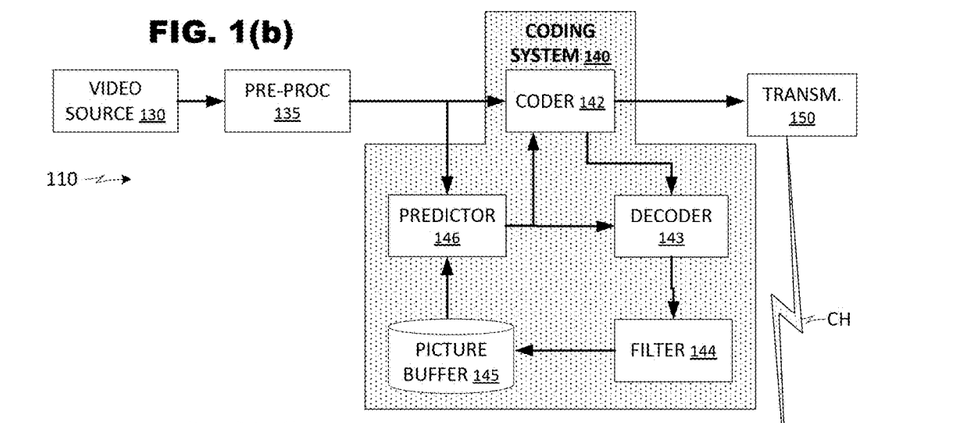
FIG. 1(b) is a functional block diagram illustrating components of an example encoding terminal.

FIG. 1(*b*) is a functional block diagram illustrating components of an encoding terminal 110. The encoding terminal may include a video source 130, a pre-processor 135, a coding system 140, and a transmitter 150. The video source 130 may supply video to be coded. The video source 130 may be provided as a camera that captures image data of a local environment or a storage device that stores video from some other source. The pre-processor 135 may perform signal conditioning operations on the video to be coded to prepare the video data for coding. For example, the preprocessor 135 may alter frame rate, frame resolution, and other properties of the source video. The preprocessor 135 also may perform filtering operations on the source video.

The coding system 140 may perform coding operations on the video to reduce its bandwidth. Typically, the coding system 140 exploits temporal and/or spatial redundancies within the source video. For example, the coding system 140 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

Intra-coding, in which an input pixel block is coded differentially with respect to previously coded/decoded data of a common frame.

Single prediction inter-coding, in which an input pixel block is coded differentially with respect to data of a previously coded/decoded frame.

Bi-predictive inter-coding, in which an input pixel block is coded differentially with respect to data of a pair of previously coded/decoded frames.

Combined inter-intra coding, in which an input pixel block is coded differentially with respect to data from both a previously coded/decoded frame and data from the current/common frame.

Multi-hypothesis inter-intra coding, in which an input pixel block is coded differentially with respect to data from several previously coded/decoded frames, as well as potentially data from the current/common frame.

Pixel blocks also may be coded according to other coding modes. Any of these coding modes may induce visual artifacts in decoded images, and artifacts at block boundaries may be particularly noticeable to the human visual system.

The coding system 140 may include a coder 142, a decoder 143, an in-loop filter 144, a picture buffer 145, and a predictor 146. The coder 142 may apply the differential coding techniques to the input pixel block using predicted pixel block data supplied by the predictor 146. The decoder 143 may invert the differential coding techniques applied by the coder 142 to a subset of coded frames designated as reference frames. The in-loop filter 144 may apply filtering techniques, including deblocking filtering, to the reconstructed reference frames generated by the decoder 143. The picture buffer 145 may store the reconstructed reference frames for use in prediction operations. The predictor 146 may predict data for input pixel blocks from within the reference frames stored in the picture buffer.

The transmitter 150 may transmit coded video data to a decoding terminal via a channel CH.

Figure 1C:
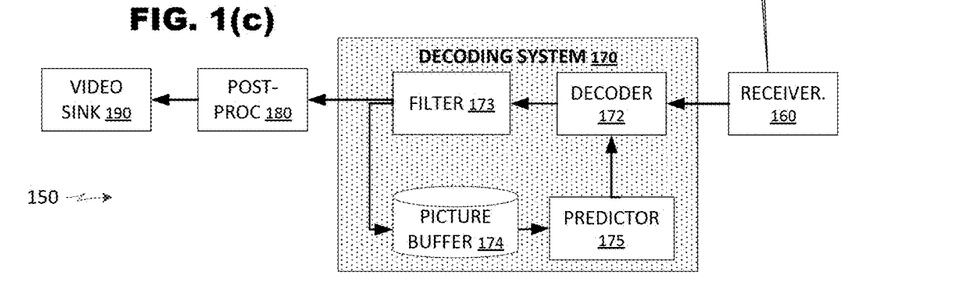
FIG. 1(c) is a functional block diagram illustrating components of an example decoding terminal.

FIG. 1(*c*) is a functional block diagram illustrating components of a decoding terminal 150 according to an embodiment of the present disclosure. The decoding terminal may include a receiver 160 to receive coded video data from the channel, a video decoding system 170 that decodes coded data, a post-processor 180, and a video sink 190 that consumes the video data.

The receiver 160 may receive a data stream from the network and may route components of the data stream to appropriate units within the terminal 200. Although FIGS. 1(*b*) and 1(*c*) illustrate functional units for video coding and decoding, terminals 110, 120 typically will include coding/decoding systems for audio data associated with the video and perhaps other processing units (not shown). Thus, the receiver 160 may parse the coded video data from other elements of the data stream and route it to the video decoder 170.

The video decoder 170 may perform decoding operations that invert coding operations performed by the coding system 140. The video decoder may include a decoder 172, an in-loop filter 173, a picture buffer 174, and a predictor 175. The decoder 172 may invert the differential coding techniques applied by the coder 142 to the coded frames. The in-loop filter 144 may apply filtering techniques, including deblocking filtering, to reconstructed frame data generated by the decoder 172. For example, the in-loop filter 144 may perform various filtering operations (e.g., de-blocking, de-ringing filtering, sample adaptive offset processing, and the like). The filtered frame data may be output from the decoding system. The picture buffer 174 may store reconstructed reference frames for use in prediction operations. The predictor 175 may predict data for input pixel blocks from within the reference frames stored by the picture buffer according to prediction reference data provided in the coded video data.

The post-processor 180 may perform operations to condition the reconstructed video data for display. For example, the post-processor 180 may perform various filtering operations (e.g., de-blocking, de-ringing filtering, and the like), which may obscure visual artifacts in output video that are generated by the coding/decoding process. The post-processor 180 also may alter resolution, frame rate, color space, etc. of the reconstructed video to conform it to requirements of the video sink 190.

The video sink 190 represents various hardware and/or software components in a decoding terminal that may consume the reconstructed video. The video sink 190 typically may include one or more display devices on which reconstructed video may be rendered. Alternatively, the video sink 190 may be represented by a memory system that stores the reconstructed video for later use. The video sink 190 also may include one or more application programs that process the reconstructed video data according to controls provided in the application program. In some embodiments, the video sink may represent a transmission system that transmits the reconstructed video to a display on another device, separate from the decoding terminal. For example, reconstructed video generated by a notebook computer may be transmitted to a large flat panel display for viewing.

The foregoing discussion of the encoding terminal and the decoding terminal (FIGS. 1(b) and 1(c)) illustrates operations that are performed to code and decode video data in a single direction between terminals, such as from terminal 110 to terminal 150 (FIG. 1(a)). In applications where bidirectional exchange of video is to be performed between the terminals 110, 150, each terminal 110, 150 will possess the functional units associated with an encoding terminal (FIG. 1(b)) and each terminal 110, 150 also will possess the functional units associated with a decoding terminal (FIG. 1(c)). Indeed, in certain applications, terminals 110, 150 may exchange multiple streams of coded video in a single direction, in which case, a single terminal (say terminal 110) will have multiple instances of an encoding terminal (FIG. 1(b)) provided therein. Such implementations, although not illustrated in FIG. 1, are fully consistent with the present discussion.

Figure 2:
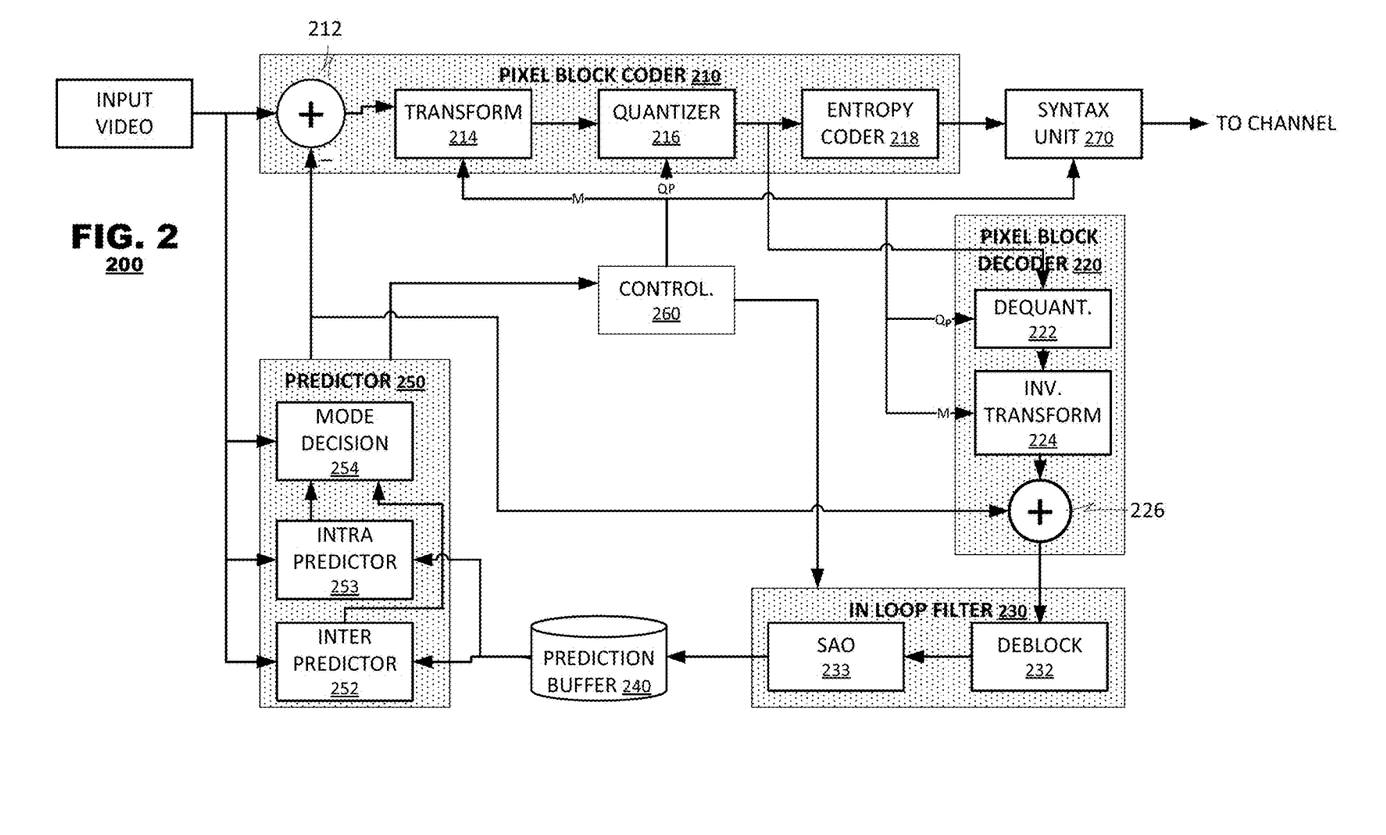
FIG. 2 is a functional block diagram of an example coding system.

FIG. 2 is a functional block diagram of a coding system 200 according to an embodiment of the present disclosure. The system 200 may include a pixel block coder 210, a pixel block decoder 220, an in-loop filter system 230, a prediction buffer 240, a predictor 250, a controller 260, and a syntax unit 270. The pixel block coder and decoder 210, 220 and the predictor 250 may operate iteratively on individual pixel blocks of a frame. The predictor 250 may predict data for use during coding of a newly-presented input pixel block. The pixel block coder 210 may code the new pixel block by predictive coding techniques and present coded pixel block data to the syntax unit 270. The pixel block decoder 220 may decode the coded pixel block data, generating decoded pixel block data therefrom. The in-loop filter 230 may perform various filtering operations on decoded frame data that is assembled from the decoded pixel blocks obtained by the pixel block decoder 220. The filtered frame data may be stored in the prediction buffer 240 where it may be used as a source of prediction of a later-received pixel block. The syntax unit 270 may assemble a data stream from the coded pixel block data which conforms to a governing coding protocol.

The pixel block coder 210 may include a subtractor 212, a transform unit 214, a quantizer 216, and an entropy coder 218. The pixel block coder 210 may accept pixel blocks of input data at the subtractor 212. The subtractor 212 may receive predicted pixel blocks from the predictor 250 and generate an array of pixel residuals therefrom representing a difference between the input pixel block and the predicted pixel block. The transform unit 214 may apply a transform to the pixel residual output from the subtractor 212 to convert the residual data from the pixel domain to a domain of transform coefficients. The quantizer 216 may perform quantization of transform coefficients output by the transform unit 214. The quantizer 216 may be a uniform or a non-uniform quantizer. The entropy coder 218 may reduce bandwidth of the output of the quantizer by coding the output, for example, by variable length code words. Elements of system 200, including deblocking filter 232, may conform to a video coding standard such as H.264 or H.265.

During operation, the quantizer 216 may operate according to coding parameters that govern each unit's operation. The quantizer 216 may operate according to a quantization parameter ($Q_P$) that determines a level of quantization to apply to the transform coefficients input to the quantizer 216. The quantization parameter may be selected by a controller 260 based on an estimate of a target bitrate that each coded frame should match and also based on analyses of each frame's image content. The quantization parameters $Q_P$ may be signaled in coded video data output by the coding system 200, either expressly or impliedly.

The transform unit 214 may operate in a variety of transform modes as events warrant. For example, the transform unit 214 may be selected to apply a DCT, a DST, a Walsh-Hadamard transform, a Haar transform, a Daubechies wavelet transform, or the like. In an embodiment, a controller 260 may select a coding mode M to be applied by the transform unit 214 and may configure the transform unit 214 accordingly. The coding mode M also may be signaled in the coded video data, either expressly or impliedly.

The pixel block decoder 220 may invert coding operations of the pixel block coder 210. For example, the pixel block decoder 220 may include a dequantizer 222, an inverse transform unit 224, and an adder 226. The pixel block decoder 220 may take its input data from an output of the quantizer 216. Although permissible, the pixel block decoder 220 need not perform entropy decoding of entropy-coded data since entropy coding is a lossless event. The dequantizer 222 may invert operations of the quantizer 216 of the pixel block coder 210. The dequantizer 222 may perform uniform or non-uniform de-quantization as specified by the decoded signal $Q_P$. Similarly, the inverse transform unit 224 may invert operations of the transform unit 214 and it may use the same transform mode M as its counterpart in the pixel block coder 210.

The adder 226 may invert operations performed by the subtractor 212. It may receive the same prediction pixel block from the predictor 250 that the subtractor 212 used in generating residual signals. The adder 226 may add the prediction pixel block to reconstructed residual values output by the inverse transform unit 224 and may output reconstructed pixel block data. Coding and decoding operations of the pixel block coder 210 and the pixel block decoder 220 are lossy processes and, therefore, decoded video data output by the pixel block decoder likely will exhibit some loss of content as compared to the input data that is supplied to the pixel block coder 210.

Where the pixel block coder 210 and pixel block decoder 220 operates on pixel block-sized increments of an image, the in-loop filter 230 may operate on reassembled frames made up of decoded pixel blocks. The in-loop filter 230 may perform various filtering operations on the reassembled frames. For example, the in-loop filter 230 may include a deblocking filter 232 and a sample adaptive offset ("SAO") filter 233. The deblocking filter 232 may filter data at seams between reconstructed pixel blocks to reduce discontinuities between the pixel blocks that arise due to coding losses. The deblocking filter may operate according to filtering parameters and may be designed for operation on data associated with a reference EOTF with a reference dynamic range domain. SAO filters may add offsets to pixel values according to an SAO "type," for example, based on edge direction/shape and/or pixel/color component level. The in-loop filter 230 may operate according to parameters that are selected by the controller 260.

The prediction buffer 240 may store filtered frame data for use in later prediction of other pixel blocks. Different types of prediction data are made available to the predictor 250 for different prediction modes. For example, for an input pixel block, intra prediction takes a prediction reference from decoded data of the same frame in which the input pixel block is located. Thus, the prediction buffer 240 may store decoded pixel block data of each frame as it is coded. For the same input pixel block, inter prediction may take a prediction reference from previously coded and decoded frame(s) that are designated as "reference frames." Thus, the prediction buffer 240 may store these decoded reference frames.

As discussed, the predictor 250 may supply prediction data to the pixel block coder 210 for use in generating residuals. The predictor 250 may include an inter predictor 252, an intra predictor 253 and a mode decision unit 254. The inter predictor 252 may receive pixel block data representing a new pixel block to be coded and may search the prediction buffer 240 for pixel block data from reference frame(s) for use in coding the input pixel block. The inter predictor 252 may support a plurality of prediction modes, such as P mode coding and B mode coding. The inter predictor 252 may select an inter prediction mode and supply prediction data that provides a closest match to the input pixel block being coded. The inter predictor 252 may generate prediction reference indicators, such as motion vectors, to identify which portion(s) of which reference frames were selected as source(s) of prediction for the input pixel block.

The intra predictor 253 may support Intra (I) mode coding. The intra predictor 253 may search from among coded pixel block data from the same frame as the pixel block being coded that provides a closest match to the input pixel block. The intra predictor 253 also may generate prediction reference indicators to identify which portion of the frame was selected as a source of prediction for the input pixel block.

The mode decision unit 254 may select a final coding mode to be applied to the input pixel block. Typically, the mode decision unit 254 selects the prediction mode that will achieve the lowest distortion when video is decoded given a target bitrate. Exceptions may arise when coding modes are selected to satisfy other policies to which the coding system 200 adheres, such as satisfying a particular channel behavior, or supporting random access or data refresh policies. The mode decision unit 254 may output the prediction data to the pixel block coder and decoder 210, 220 and may supply to the controller 260 an identification of the selected prediction mode along with the prediction reference indicators corresponding to the selected mode.

The controller 260 may control overall operation of the coding system 200. The controller 260 may select operational parameters for the pixel block coder 210 and the predictor 250 based on analyses of input pixel blocks and also external constraints, such as coding bitrate targets and other operational parameters. As is relevant to the present discussion, when it selects quantization parameters QP, the use of uniform or non-uniform quantizers, and/or the transform mode M, it may provide those parameters to the syntax unit 270, which may include data representing those parameters in the data stream of coded video data output by the system 200. During operation, the controller 260 may revise operational parameters of the quantizer 216 and the transform unit 214 at different granularities of image data, either on a per pixel block basis or on a larger granularity (for example, per frame, per slice, per largest coding unit ("LCU") or another region).

Additionally, as discussed, the controller 260 may control operation of the in-loop filter 230 and the prediction unit 250. Such control may include, for the prediction unit 250, mode selection (lambda, modes to be tested, search windows, distortion strategies, etc.), and, for the in-loop filter 230, selection of filter parameters, reordering parameters, weighted prediction, etc.

Figure 3:
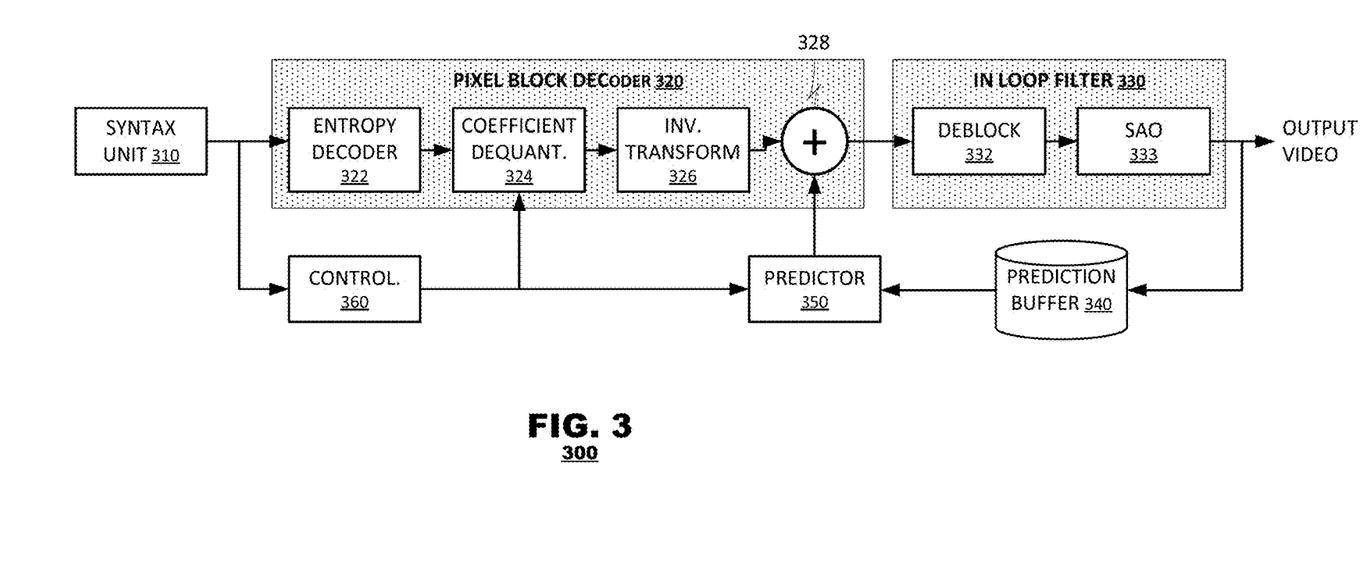
FIG. 3 is a functional block diagram of an example decoding system.

FIG. 3 is a functional block diagram of a decoding system 300 according to an embodiment of the present disclosure. The decoding system 300 may include a syntax unit 310, a pixel-block decoder 320, an in-loop filter 330, a prediction buffer 340, a predictor 350 and a controller 360. The syntax unit 310 may receive a coded video data stream and may parse the coded data into its constituent parts. Data representing coding parameters may be furnished to the controller 360 while data representing coded residuals (the data output by the pixel block coder 210 of FIG. 2) may be furnished to the pixel block decoder 320. The pixel block decoder 320 may invert coding operations provided by the pixel block coder (FIG. 2). The in-loop filter 330 may filter reassembled frames built from decoded pixel block data. The filtered frame data may be output from the system 300 for display as output video. Filtered reference frames also may be stored in the prediction buffer 340 for use in prediction operations. The predictor 350 may supply prediction data to the pixel block decoder 320 as determined by coding data received in the coded video data stream. Elements of system 300, including deblocking filter 332, may conform to a video coding standard such as H.264 or H.265.

The pixel block decoder 320 may include an entropy decoder 322, a dequantizer 324, an inverse transform unit 326, and an adder 328. The entropy decoder 322 may perform entropy decoding to invert processes performed by the entropy coder 218 (FIG. 2). The dequantizer 324 may invert operations of the quantizer 216 of the pixel block coder 210 (FIG. 2). It may use the quantization parameters $Q_P$ and the quantizer mode data M that are provided in the coded video data stream. The adder 328 may invert operations performed by the subtractor 212 (FIG. 2). It may receive a prediction pixel block from the predictor 350 as determined by prediction references in the coded video data stream. The adder 328 may add the prediction pixel block to reconstructed residual values output by the inverse transform unit 326 and may output decoded pixel block data.

The in-loop filter 330 may perform various filtering operations on reconstructed pixel block data. As illustrated, the in-loop filter 330 may include a deblocking filter 332 and an SAO filter 333. The deblocking filter 332 may filter data at seams between reconstructed pixel blocks to reduce discontinuities between the pixel blocks that arise due to coding. The deblocking filter may operate according to filtering parameters and may be designed for operation on data associated with a certain EOTF with a certain dynamic range domain. SAO filters may add offset to pixel values according to an SAO type, for example, based on edge direction/shape and/or pixel level. Other types of in-loop filters may also be used in a similar manner. Operation of the deblocking filter 332 and the SAO filter 333 ideally would mimic operation of their counterparts in the coding system 200 (FIG. 2). Thus, in the absence of transmission errors or other abnormalities, the decoded frame data obtained from the in-loop filter 330 of the decoding system 300 would be the same as the decoded frame data obtained from the in-loop filter 230 of the coding system 200 (FIG. 2). In this manner, the coding system 200 and the decoding system 300 should store a common set of reference pictures in their respective prediction buffers 240, 340.

The prediction buffer 340 may store filtered pixel data for use in later prediction of other pixel blocks. The prediction buffer 340 may store decoded pixel block data of each frame as it is coded for use in intra prediction. The prediction buffer 340 also may store decoded reference frames.

As discussed, the predictor 350 may supply prediction data to the pixel block decoder 320. The predictor 350 may supply predicted pixel block data as determined by the prediction reference indicators supplied in the coded video data stream.

The controller 360 may control overall operation of the coding system 300. The controller 360 may set operational parameters for the pixel block decoder 320 and the predictor 350 based on parameters received in the coded video data stream. As is relevant to the present discussion, these operational parameters quantization parameters $Q_P$ and transform modes M for the inverse transform unit 326. As discussed, the received parameters may be set at various granularities of image data, for example, on a per pixel block basis, a per frame basis, a per slice basis, a per LCU basis, or based on other types of regions defined for the input image.

Figure 4:
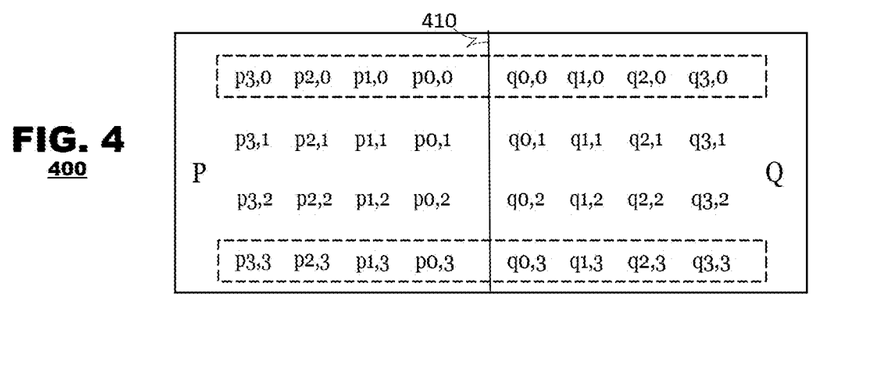
FIG. 4 depicts an example of pixels at the boundary of two neighboring pixel blocks.

FIG. 4 illustrates an exemplary pair of pixel blocks P and Q which share a vertical boundary 410 between them. Pixels close to the boundary 410 may be used as input when determining parameters of a deblocking filter, and the deblocking filter may also be applied to the pixels close to the boundary 410.

Deblocking Filters Parameters

Figure 5:
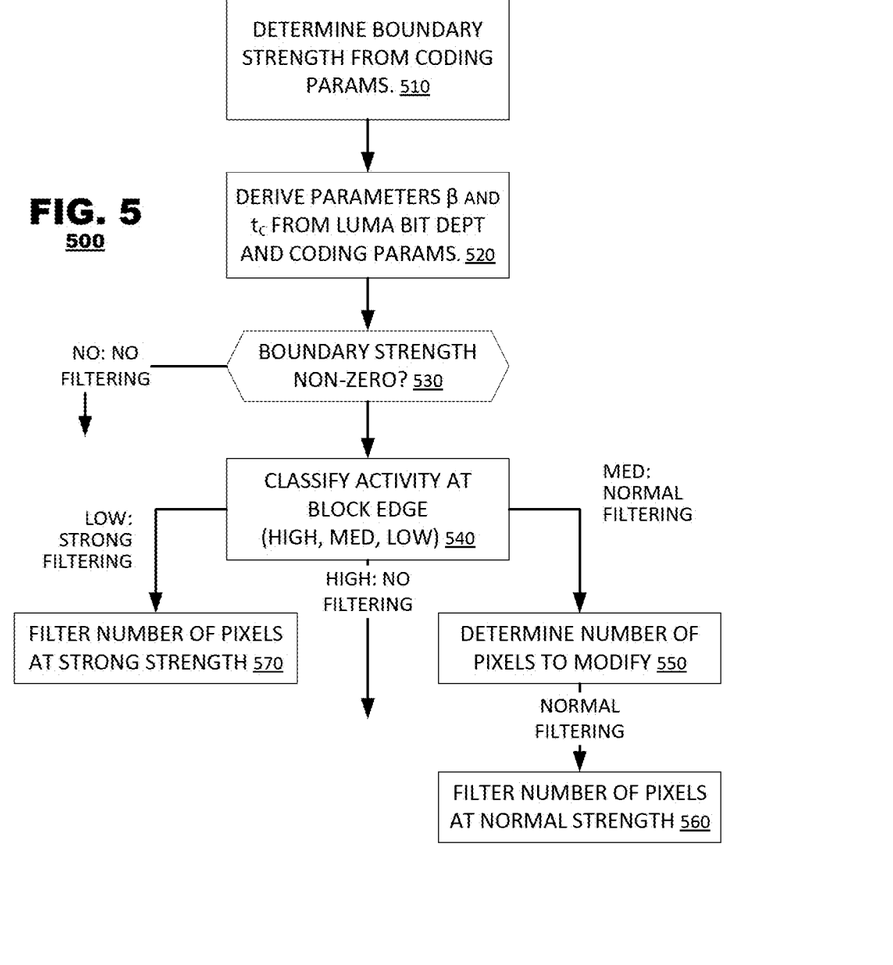
FIG. 5 illustrates an example method for selecting deblocking filtering parameters.

FIG. 5 illustrates a method 500 for selecting deblocking filtering parameters. Method 500 may be used with, for example, the encoder deblocking filter 232 of FIG. 2. The method 500 may determine a boundary strength value for pixel blocks based on coding parameters of the pixel blocks (box 510). The method 500 also may derive parameters β and $t_C$ based on a bit depth for luma components of image data and based on quantization parameters of the pixel block and two parameters defined in coded slice data, slice_beta_offset_div2 and slice_$t_C$_offset_div2 (box 520). Both β the $t_C$ parameters may be used for classifying activity of pixel blocks and the $t_C$ parameter may be also used for filtering. The method 500 may determine whether the boundary strength is zero (box 530); if so, no filtering is needed.

If the boundary strength is non-zero, the method 500 may classify activity of the pixel blocks (box 540). Several classifications are possible, including high activity, medium activity, and low activity. Classification may be done by comparing measure of local pixel activity to thresholds, for example thresholds determined from parameters β the $t_C$. If a high activity classification is applied, no filtering is needed. If medium activity classification is applied, the method 400 may determine a number of pixels to modify (box 550). Then the method 500 may filter the determined number of pixels using either a normal filtering strength when medium activity classifications are applied (box 560) or a strong filtering strength when a low activity classification is applied (box 570).

Embodiments of the present disclosure provide techniques for selecting parameters for deblocking filtering, such the deblocking filters used in the H.264 and H.265 video encoder and decoder systems. According to embodiments, selection of deblocking filter parameters may be based on a reference EOTF, such as an EOTF that a deblocking filter is designed for, and the EOTF of the data the deblocking filter will be used on. The reference EOTF and the EOTF of the data may not be the same.

Deblocking filters, such as those in HEVC and H.264 may include six operations for selecting parameters for, and applying, a deblocking filter with an associated reference EOTF. These operations can be modified to improve results for when applied to image data having a different EOTF. The six operations are described in more detail below, followed by embodiments of techniques for selection of modified parameters.

Video coding standards, such as HEVC (High Efficiency Video Coding) and its predecessors, may adopt block-based prediction, transformation, and quantization. In such coding standards, one picture is divided into square or rectangular blocks. Each block has its own prediction mode and motion vector. The prediction residue of each block is further transformed and quantized individually. Thus, block boundaries in reconstructed pictures probably have blocking artifacts. The H.264/AVC and HEVC standards both apply in-loop deblocking filter to detect and attenuate visual artifacts at block boundaries, as explained above regarding FIGS. 2 and 3.

In a first operation to select deblocking filter parameters, such as box 510, a boundary strength (BS) parameter is determined based on the coding modes, motion vectors, reference frames, and coded residues of two adjacent blocks. BS determines the strength of the filter to be performed at the block boundary. The decision of BS in HEVC is shown in Table 1.

TABLE 1

| Conditions | Boundary Strength (BS) |
| --- | --- |
| At least one of the blocks is intra. | 2 |
| The block edge is a transform block edge and at least one of the blocks has one or more non-zero transform coefficient levels | 1 |
| Two blocks use different reference frames or a different number of motion vectors. | 1 |
| Each block has one motion vector. And the absolute difference between the horizontal or vertical component of two motion vectors is greater than or equal to 4 in units of quarter luma samples. | 1 |
| Two motion vectors and two different reference frames are used for each block. And the absolute difference between the horizontal or vertical component of two motion vectors used to predict two blocks for the same reference frames is greater than or equal to 4 in units of quarter luma samples. | 1 |
| Each block use two motion vectors for the same reference frame in the prediction. And the absolute difference between the horizontal or vertical component of list 0 (or list 1) motion vectors is greater than or equal to 4 in units of quarter luma samples. And the absolute difference between the horizontal or vertical component of list 0 (or list 1) motion vector for one block and list 1 (or list 0) motion vector for the other block is greater than or equal to 4 in units of quarter luma samples. | 1 |
| Otherwise | 0 |

In a second operation to select deblocking filter parameters, such as box 520, parameters β and $t_C$ may be determined tables and indices into the tables. In practice, a pair of tables, called a "β-table" and a "$t_C$-table" may be populated with values for use by the method 500. Parameters β and $t_C$ may be derived from the β-table and the $t_C$-table respectively. The index B of β-table is derived as:

$$B = \text{Clip}(0, 51, qp + (\text{slice\_beta\_offset\_div2} \ll 1)) \quad \text{(Eq. 1)}.$$

where qp is derived from the quantization parameters of two neighboring blocks and slice_beta_offset_div2 is the value of slice syntax element slice_beta_offset_div2.

The index T of the $t_C$-table is determined based on both quantization parameter and BS as below.

$$T = \text{Clip}(0, 53, qp + 2*(BS-1) + (\text{slice\_tc\_offset\_div2} \ll 1)) \quad \text{(Eq. 2)}$$

where slice_tc_offset_div2 is the value of slice syntax element slice_tC_offset_div2.

In a third operation to select deblocking filter parameters, such as box 530, to preserve true edges in pictures, if BS is larger than 0, local activity is further checked to determine whether the filter is applied or not at the boundary. In HEVC, the samples across each edge, as shown in FIG. 4, are analyzed. If it satisfies the check below, the filter is going to be applied, otherwise no filtering is done.

$$|p2,0 - 2*p1,0 + p0,0| + |p2,3 - 2*p1,3 + p0,3| + |q2,0 - 2*q1,0 + q0,0| + |q2,3 - 2*q1,3 + q0,3| < \beta \quad \text{(Eq. 3)}$$

In a fourth operation to select deblocking filter parameters, such as box 540, when BS is non-zero and the check in Equation (3) holds, deblocking filter is applied. It switches between the normal mode and strong mode based on local signal characteristics. Same set of pixels as shown in FIG. 4 are used to make the filter strength decision. If the Equations (4) (5) and (6) all hold for both 1=0 and 1=3, a strong filter is utilized; otherwise, a normal filter will be used.

$$2*|p2,i - 2*p1,i + p0,i| + |2q2,i - 2*|q1,i + q0,i| < (\beta \gg 2) \quad \text{(Eq. 4)}$$

$$|p3,i - p0,i| + |q0,i - q3,i| < (\beta \gg 3) \quad \text{(Eq. 5)}$$

$$|p0,i - q0,i| < ((5*t_c + 1) \gg 1) \quad \text{(Eq. 6)}$$

In a fifth operation to select deblocking filter parameters, such as box 550, in normal filtering mode, a decision on how many pixels are modified is further made. If the check in Equation (7) is satisfied, two nearest pixels in block P could be changed in the filter operations; otherwise, only one nearest pixel is subject to the change. Block Q makes the decision in same way.

$$|p2,0 - 2*p1,0 + p0,0| + |p2,3 - 2*p1,3 + p0,3| < (\beta + (\beta \gg 1)) \gg 3 \quad \text{(Eq. 7)}$$

In a sixth operation, the deblocking filter may be applied. In strong filtering mode, the pixels are changed as Equation (8), such as in box 560.

$$p' = \text{Clip}((p - 2*t_c), (p + 2*t_c), p_f) \quad \text{(Eq. 8)}$$

where $p_f$ is the impulse response of the filter corresponding to the pixel p, p' is the filtered pixel output, and Clip (min, max, X) clips the value X to between min and max.

In normal filter, such as in block 570, input pixels are modified as p'=p+d'. Before the offset d is added to the pixel, it is clipped to d' as in Equation (9)

$$d' = \text{Clip}(-c, c, d) \quad \text{(Eq. 9)}$$

where for pixels p0,i and q0,i, $c = t_C$; for pixels p1,i and q1,i, $c = t_C \gg 1$.

When a deblocking filter is applied to chroma data, the chroma filter may be applied when BS=2, which means at least one of the blocks is intra.

Figure 6:
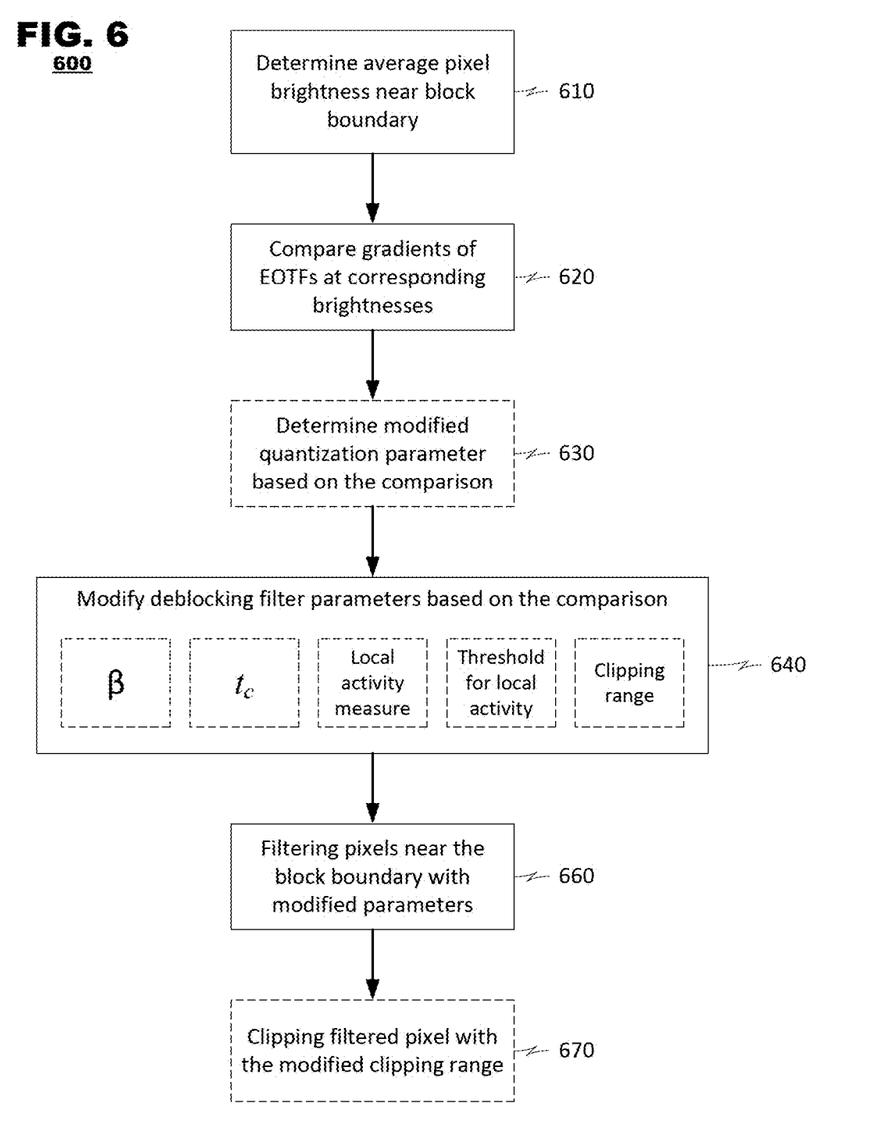
FIG. 6 illustrates an example method for a deblocking filter with modified filter parameters.

FIG. 6 illustrates a method 600 for selecting deblocking filtering parameters according to embodiments of the present disclosure. Method 600 may determine an average brightness of pixels near a block boundary (box 610). The gradient of an HDR EOTF (a first EOTF) at the average brightness and the gradient of a reference EOTF (a second EOTF) at the corresponding brightness may be compared (box 620), where the average brightness achieves the same linear luminance through HDR EOTFs as what the corresponding brightness achieves through a reference EOTF. In some embodiments, the comparison may include calculating a ratio of the EOTF gradients at an average brightness and at a corresponding brightness. In optional box 630, a modified quantization parameter maybe determined based on the comparison. Various parameters of the deblocking filter may be modified based on the comparison of EOTF gradients and the optional modified quantization parameter (box 640). In box 640, one or more of the following parameters may be modified: β, $t_C$, a local activity measure, a threshold for the local active measure, and a clipping range. Pixels near the block boundary are filtered with the modified parameters (box 660). Optionally, the filtered pixels may be clipped with the modified clipping range. A fuller explanation of modifying deblocking filter parameters, as in method 600, is provided below in conjunction with descriptions of five embodiments of the present disclosure. In some of these embodiments, a video encoder or decoder with a deblocking filter designed for operation with image data having a first EOTF may be modified to operate on image data having a second EOTF. In some embodiments, the first EOTF is a reference EOTF such as an SDR or Gamma EOTF, and the second EOTF may be an HDR EOTF.

Modified β and $t_C$

In a first embodiment, a deblocking filter designed for a reference EOTF, such as an SDR EOTF, may not provide the best results when applied to image data associated with a different EOTF, such as an HDR EOTF. Improved results may be obtained by adjusting one or more parameters used by deblocking filter. A deblocking filter for content having a first EOTF is adjusted for use with content having a second EOTF based on an average brightness of pixels at the block boundary and the first and second EOTFs. More particularly, the deblocking filtering parameters β and $t_C$ may be determined based on a comparison of the gradient of a HDR EOTF at an average brightness of pixels near the boundary and the gradient of a reference EOTF at a corresponding brightness, where the average brightness achieves the same linear luminance through a HDR EOTF as what the corresponding brightness achieves through a reference EOTF. For example, a quantization parameter used to determine β and $t_C$ of a deblocking filter for SDR image data, such the deblocking filters of H.264 or H.265, can be adjusted to operate on HDR image data based on a ratio of a gradient of HDR EOTF at an average brightness of image data at the boundary and a gradient of reference EOTF at a corresponding brightness, where the average brightness achieves the same linear luminance through a HDR EOTF as what the corresponding brightness achieves through a reference EOTF.

In an example of this first embodiment, the derivation of two deblocking parameters β and $t_C$ in HDR video compression uses the adjusted quantization parameter (denoted as qp_hdr_deblock). The adjusted quantization parameter qp_hdr_deblock is used instead of qp in Equation (1) and Equation (2) to achieve the index B of β-table B and the index of $t_C$-table T. Then, the index B of β-table and the index T of $t_C$-table are utilized to derive two deblocking parameters β and $t_C$ from β-table and $t_C$-table respectively.

The adjusted quantization parameter qp_hdr_deblock is generated from the quantization parameter used in the quantization module of video compression (denoted as qp_hdr_quant) adopting the relationship between the EOTF in HDR processing (e.g., PQ EOTF) and the EOTF of a visually uniform reference, as shown in Equation (10). eotf_hdr( ) denotes the EOTF in HDR processing, for example the PQ EOTF as recommended in SMPTE ST 2084. eotf_ref( ) denotes the EOTF of a visually uniform reference. oetf_ref( ) is the optical-electro transfer function (OETF) of a visually uniform reference to convert linear luminance to digital code words (where generally an OETF is the inverse of an EOTF). When the display has some additional tone-mapping or optical-optical transfer function (OOTF), it may also considered and included in the HDR EOTF. More generally, the HDR EOTF (or eotf_hdr( ) in this example may represent a combination of EOTF of video data and OOTF of a target display.

$$\text{qp\_hdr\_deblock} = \text{qp\_hdr\_quant} + \quad \text{(Eq. 10)}$$
$$6*\log_2\left(\frac{\text{gradient\_hdr(ave\_brightness)}}{\text{gradient\_ref(oetf\_ref(eotf\_hdr(ave\_brightness)))}}\right)$$

where ave_brightness denotes the normalized average of the luma pixels across the boundary and 0≤ave_brightness≤1. For example, in FIG. 4, ave_brightess is the normalized average of all luma pixels including pi,j and qi,j, where 0≤i≤3 and 0≤j≤3. gradient_hdr( ) and gradient_ref( ) denote the gradient values of a given brightness value (denoted as x) in the EOTF of HDR processing (e.g., PQ EOTF) and in the EOTF of a visually uniform reference respectively. They are illustrated as below.

$$\text{gradient\_hdr}(x) = \frac{\text{eotf\_hdr}(x+\Delta x) - \text{oetf\_hdr}(x-\Delta x)}{2*\Delta x} \quad \text{(Eq. 11)}$$

$$\text{gradient\_ref}(x) = \frac{\text{eotf\_ref}(x+\Delta x) - \text{eotf\_ref}(x-\Delta x)}{2*\Delta x} \quad \text{(Eq. 12)}$$

Figure 7:
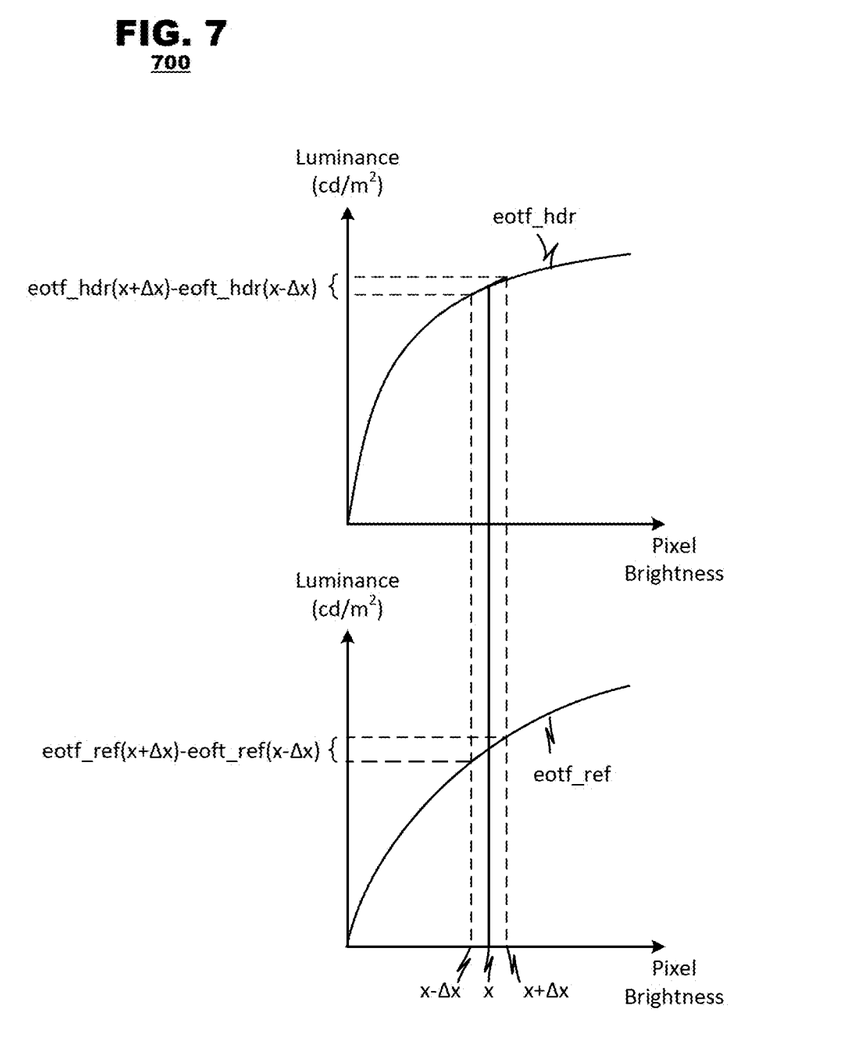
FIG. 7 is an example graph of linear luminance versus brightness of pixels in different EOTFs.

FIG. 7 is an example graph of linear luminance versus brightness of pixels in different EOTFs. FIG. 7 may help illustrate the calculation of gradients in Equations (11) and (12). An example reference EOTF (eotf_ref) and an example HDR EOTF (eotf_hdr) are plotted with linear luminance (for example measured in cd/m²) on the vertical axis against pixel brightness on the horizontal axis. A gradient estimate for both HDR and reference EOTFs at a brightness x can be determined over a window defined by Δx as the range of brightness values from x−Δx to x+Δx.

Modified Local Activity Measure

In a second embodiment, a deblocking filter is based on an adjusted measure of local pixel activity around a block boundary. More particularly, a local activity measure may be adjusted based on a ratio of the gradient of HDR EOTF at an average brightness of pixels at the boundary and the gradient of a reference EOTF at a corresponding brightness, where the average brightness achieves the same linear luminance through a HDR EOTF as what the corresponding brightness achieves through a reference EOTF. Deblocking filter decisions may be made by comparing the adjusted local activity measure to a threshold.

In an example of this second embodiment, the local activity checking for filter decisions including: turning on or off the deblocking filter, determining deblocking mode, determining how many pixels are modified in the filter and so on, adopts the adjusted local signal characteristics and then compares them with the thresholds. The calculated local signal characteristics (denoted as signal_activity), for example the left operands in Equations (3) (4) (5) (6) and (7), are adjusted considering the EOTF of HDR processing (e.g., PQ EOTF) and the EOTF of a visually uniform reference. The adjusted characteristics (denoted as signal_activity_adjusted) may be achieved as in Equation (13).

$$\text{signal\_activity\_adjusted} = \text{signal\_activity} * \quad \text{(Eq. 13)}$$
$$\frac{\text{gradient\_hdr(ave\_brightness)}}{\text{gradient\_ref(oetf\_ref(eotf\_hdr(ave\_brightness)))}}$$

where ave_brightness denotes the normalized average of the luma pixels across the block boundary and 0≤ave_brightness ≤1. For example, in FIG. 4, ave_brightess is the normalized average of all luma pixels including pi,j and qi,j, where 0≤i≤3 and 0≤j≤3. gradient_hdr( ) and gradient_ref( ) denote the gradient values of a given brightness value in the EOTF of HDR processing (e.g., PQ EOTF) and in the EOTF of a visually uniform reference respectively. They are illustrated in Equation (11) and Equation (12). eotf_hdr( ) denotes the EOTF in HDR processing, for example the PQ EOTF as recommended in SMPTE ST 2084. eotf_ref( ) denotes the EOTF of a visually uniform reference. oetf_ref( ) is the OETF of a visually uniform reference to convert linear luminance to digital code words. When the display has some additional tone-mapping or OOTF, it is also considered and included in the EOTF.

Then the adjusted characteristics (i.e., signal_activity_adjusted) are compared with the thresholds, for example, the right operands in Equations (3) (4) (5) (6) and (7). They are calculated with the parameters β and $t_C$ that could be derived with the first embodiment for a modified β and $t_C$ above.

Modified Threshold for a Local Activity Measure

In a third embodiment, a deblocking filter includes adjusting thresholds used for testing a measure of local pixel activity. More particularly, activity threshold may be adjusted based on a ratio of the gradient of HDR EOTF at an average brightness of pixels at the boundary and the gradient of a reference EOTF at a corresponding brightness, where the average brightness achieves the same linear luminance through a HDR EOTF as what the corresponding brightness achieves through a reference EOTF. Deblocking filter decisions may be made by comparing a local activity measure to an adjusted activity threshold.

In an example of the third embodiment, the local activity checking for filter decisions including turning on/off deblocking filter, determining deblocking mode, determining how many pixels are modified in the filter and so on, adopts the adjusted thresholds instead of changing the local activity (as in the second embodiment for a modified local activity measure above). The thresholds (denoted as thresh), for example, the right operands in Equations (3) (4) (5) (6) and (7), are first derived with the first embodiment for modified β and $t_C$, and then modified considering the EOTF of HDR processing (e.g., PQ EOTF) and the EOTF of a visually uniform reference. The proposed adjustment is shown in Equation (14). Then the adjusted thresholds (denoted as thresh_adjusted) are used in the local activity checking.

$$\text{thresh\_adjusted} = \text{thresh} * \frac{\text{gradient\_ref}(\text{oetf\_ref}(\text{eotf\_hdr}(\text{ave\_brightness})))}{\text{gradient\_hdr}(\text{ave\_brightness})} \quad \text{(Eq. 14)}$$

where ave_brightness denotes the normalized average of the luma pixels across the block boundary and 0≤ave_brightness ≤1. For example, in FIG. 4, ave_brightess is the normalized average of all luma pixels including pi,j and qi,j, where 0≤i≤3 and 0≤j≤3. gradient_hdr( ) and gradient_ref( ) denote the gradient values of a given brightness value in the EOTF of HDR processing (e.g., PQ EOTF) and in the EOTF of a visually uniform reference respectively. They are illustrated in Equation (11) and Equation (12). eotf_hdr( ) denotes the EOTF in HDR processing, for example the PQ EOTF as recommended in SMPTE ST 2084. eotf_ref( ) denotes the EOTF of a visually uniform reference. oetf_ref( ) is the OETF of a visually uniform reference to convert linear luminance to digital code words. When the display has some additional tone-mapping or OOTF, it is also considered and included in the EOTF.

Modified Post-Filter Clipping Range

In a fourth embodiment, the clipping range is adjusted for clipping after application of a deblocking filter. More particularly, a clipping range may be adjusted based on a ratio of the gradient of HDR EOTF at an average brightness of pixels at the boundary and the gradient of a reference EOTF at a corresponding brightness, where the average brightness achieves the same linear luminance through a HDR EOTF as what the corresponding brightness achieves through a reference EOTF.

In an example of the fourth embodiment, the clipping range value used to limit the introduced pixel difference by filtering (e.g., 2*tc in Equation (8) and c in Equation (9)) is adjusted considering the EOTF of HDR processing (e.g., PQ EOTF) and the EOTF of a visually uniform reference. The original clipping range value is denoted as clipping and the adjusted ones are denoted as clipping adjusted. The proposed adjustment is shown in Equation (15) below.

$$\text{clipping\_adjusted} = \text{clipping} * \frac{\text{gradient\_ref}(\text{oetf\_ref}(\text{eotf\_hdr}(\text{ave\_brightness})))}{\text{gradient\_hdr}(\text{ave\_brightness})} \quad \text{(Eq. 15)}$$

where ave_brightness denotes the normalized average of the luma pixels across the block boundary and 0≤ave_brightness ≤1. For example, in FIG. 4, ave_brightess is the normalized average of all luma pixels including pi,j and qi,j, where 0≤i≤3 and 0≤j≤3. gradient_hdr( ) and gradient_ref( ) denote the gradient values of a given brightness value in the EOTF of HDR processing (e.g., PQ EOTF) and in the EOTF of a visually uniform reference respectively. They are illustrated in Equation (11) and Equation (12). eotf_hdr( ) denotes the EOTF in HDR processing, for example the PQ EOTF as recommended in SMPTE ST 2084. eotf_ref( ) denotes the EOTF of a visually uniform reference. oetf_ref( ) is the OETF of a visually uniform reference to convert linear luminance to digital code words. When the display has some additional tone-mapping or OOTF, it is also considered and included in the EOTF.

Deblocking Filter of Chroma at Inter-Inter Block Boundaries

In a fifth embodiment, a deblocking filter is applied to chroma data at inter-inter block boundaries. In H.264 and H.265, the deblocking filter is only applied to chroma data at block boundaries where the boundary strength BS=2, as explained above. A deblocking filter for HDR content may be created by modifying a deblocking filter such as the deblocking filter of H.264 or H.265 by altering the deblocking filter for chroma data to include deblock filtering at boundaries between two inter-coded blocks.

In an example of the fifth embodiment, the deblocking filter may be modified to be applied to chroma data when BS>0. BS is defined in Table 1.

As discussed above, FIGS. 1(a), 1(b), and 1(c) illustrate functional block diagrams of terminals. In implementation, the terminals may be embodied as hardware systems, in which case, the illustrated blocks may correspond to circuit sub-systems. Alternatively, the terminals may be embodied as software systems, in which case, the blocks illustrated may correspond to program modules within software programs executed by a computer processor. In yet another embodiment, the terminals may be hybrid systems involving both hardware circuit systems and software programs. Moreover, not all of the functional blocks described herein need be provided or need be provided as separate units. For example, although FIG. 1(b) illustrates the components of an exemplary encoder, including components such as the pre-processor 135 and coding system 140, as separate units. In one or more embodiments, some components may be integrated. Such implementation details are immaterial to the operation of the present invention unless otherwise noted above. Similarly, the encoding, decoding and post-processing operations described with relation to FIGS. 5, and 6 may be performed continuously as data is input into the encoder/decoder. The order of the steps as described above does not limit the order of operations.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. Method of image filtering at a block boundary comprising:
    determining an average brightness of pixels of neighboring decoded blocks;
    determining a first gradient of a first electro-optical transfer function (EOTF) of a first domain of the decoded blocks at the average brightness;
    determining a second gradient of a second EOTF of a reference domain at a corresponding brightness, where the corresponding brightness achieves the same linear luminance through the second EOTF as what the average brightness achieves through the first EOTF;
    determining filter parameters of a deblocking filter based on a comparison of the first and second gradients; and
    filtering pixels at the block boundary with the deblocking filter using the filtering parameters.

2. The method of claim 1, wherein the first EOTF is a high dynamic range (HDR) EOTF, and the second EOTF is a uniform EOTF.

3. The method of claim 1, wherein:
    the deblocking filter conforms to the deblocking filter of the H.265 video compression standard; and
    the filter parameters include two parameters, $\beta$ and $t_c$, for controlling a strength of the deblocking filter.

4. The method of claim 3, further comprising:
    modifying a quantization parameter based on a ratio of the first gradient and the second gradient; and
    determining the $\beta$ and $t_c$ based on the modified quantization parameter.

5. The method of claim 1, wherein the filter parameters include a measure of local activity in pixel data at the block boundary, and further comprising:
    determining the measure of local activity based on a ratio of the first gradient and the second gradient.

6. The method of claim 1, wherein the filter parameters include an activity threshold for testing a measure of local activity in pixel data at the block boundary.

7. The method of claim 1, wherein the filter parameters include a clipping range, and further comprising:
    clipping the filtered pixels with the clipping range.

8. The method of claim 1, wherein the filtering pixels includes filtering chroma data with the deblocking filter wherein the block boundary is a boundary between a first inter-coded block and a second inter-coded block.

9. The method of claim 1, wherein the first EOTF includes aspects of an optical-optical transfer function (OOTF) of a target display.

10. A non-transitory computer readable medium comprising instructions, that when executed by a processor, cause:
    determining an average brightness of pixels of neighboring decoded blocks;
    determining a first gradient of a first electro-optical transfer function (EOTF) of a first domain of the decoded blocks at the average brightness;
    determining a second gradient of a second EOTF of a reference domain at a corresponding brightness, where the corresponding brightness achieves the same linear luminance through the second EOTF as what the average brightness achieves through the first EOTF;
    determining filter parameters of a deblocking filter based on a comparison of the first and second gradients; and
    filtering pixels at a block boundary with the deblocking filter using the filtering parameters.

11. The computer readable medium of claim 10, wherein the deblocking filter conforms to the deblocking filter of the H.265 video compression standard, the filter parameters include $\beta$ and $t_c$ that control a strength of the deblocking filter, and the instructions further cause:
    modifying a quantization parameter based on a ratio of the first gradient and the second gradient; and
    determining the $\beta$ and $t_c$ based on the modified quantization parameter.

12. The computer readable medium of claim 10, wherein the filter parameters include a measure of local activity in pixel data at the block boundary, and wherein the instructions further cause:
    determining the measure of local activity based on a ratio of the first gradient and the second gradient.

13. The computer readable medium of claim 10, wherein the filter parameters include an activity threshold for testing a measure of local activity in pixel data at the block boundary.

14. The computer readable medium of claim 10, wherein the filter parameters include a clipping range, and wherein the instructions further cause:
    clipping the filtered pixels with the clipping range.

15. The computer readable medium of claim 10, wherein the filtering pixels includes filtering chroma data with the deblocking filter wherein the block boundary is a boundary between a first inter-coded block and a second inter-coded block.

16. A system comprising:
    a deblocking filter with an associated first EOTF for filtering pixels at the a block boundary with filter parameters; and
    a controller configured to:
        determine an average brightness of pixels of neighboring decoded blocks;
        determine a first gradient of the first EOTF of a first dynamic range domain of the decoded blocks at the average brightness;
        determine a second gradient of a second EOTF of a reference domain at a corresponding brightness, where the corresponding brightness achieves the same linear luminance through the second EOTF as what the average brightness achieves through the first EOTF; and
        determine the filter parameters of the deblocking filter based on a comparison of the first and second gradients.

17. The system of claim 16, wherein the deblocking filter conforms to the deblocking filter of the H.265 video compression standard, the filter parameters include $\beta$ and $t_c$ that control a strength of the deblocking filter, and the controller is further configured to:
    modify a quantization parameter based on a ratio of the first gradient and the second gradient; and
    determine the $\beta$ and $t_c$ based on the modified quantization parameter.

18. The system of claim 16, wherein the filter parameters include a measure of local activity in pixel data at the block boundary, and the controller is further configured to:
    determine the measure of local activity based on a ratio of the first gradient and the second gradient.

19. The system of claim 16, wherein the filter parameters include an activity threshold for testing a measure of local activity in pixel data at the block boundary.

20. The system of claim 16, wherein the filter parameters include a clipping range, and the controller is further configured to:
    clip the filtered pixels with the clipping range.

* * * * *